(12) United States Patent
Reysa et al.

(10) Patent No.: US 9,965,333 B2
(45) Date of Patent: May 8, 2018

(54) AUTOMATED WORKLOAD SELECTION

(75) Inventors: John Richard Reysa, Austin, TX (US);
Bryan Ronald Hunt, Cedar Park, TX (US); Stephen McCants, Austin, TX (US); Tierney Bruce McCaughrin, Georgetown, TX (US); Brain Lee Kozitza, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2113 days.

(21) Appl. No.: 12/422,701

(22) Filed: Apr. 13, 2009

(65) Prior Publication Data
US 2010/0262975 A1    Oct. 14, 2010

(51) Int. Cl.
*G06F 9/48* (2006.01)
*G06F 9/50* (2006.01)

(52) U.S. Cl.
CPC .......... *G06F 9/5077* (2013.01); *G06F 9/4843* (2013.01)

(58) Field of Classification Search
None
See application file for complete search history.

(56) References Cited

U.S. PATENT DOCUMENTS

| | | |
|---|---|---|
| 6,230,183 B1 | 5/2001 | Yocom et al. |
| 6,609,227 B2 | 8/2003 | Bradley et al. |
| 7,434,185 B2 | 10/2008 | Dooling et al. |
| 2005/0050480 A1* | 3/2005 | Katla et al. ......... 716/1 |
| 2007/0021998 A1* | 1/2007 | Laithwaite et al. ...... 705/9 |
| 2008/0062886 A1* | 3/2008 | Tang et al. ........ 370/252 |

OTHER PUBLICATIONS

Byun et al., "Scheduling Scheme based on Dedication Rate in Volunteer Computing Environment", Proceedings of the 4th International Symposium on Parallel and Distributed Computing (ISPDC'05), 2005, pp. 1-8.*

* cited by examiner

*Primary Examiner* — John Lindlof
(74) *Attorney, Agent, or Firm* — James L. Baudino

(57) ABSTRACT

A job submission method that presents a set of algorithms that provide automated workload selection to a batch processing system that has the ability to receive and run jobs on various computing resources simultaneously is provided. If all machines in the batch system are running jobs, a queue containing the extra jobs for execution results. For compute intensive workloads, such as chip design, an automated workload selection system software layer submits jobs to the batch processing system. This keeps the batch processing system continually full of useful work The job submission system provides for organizing workloads, assigning relative ratios between workloads, associating arbitrary workload validation algorithms with a workload or parent workload, associating arbitrary selection algorithms with a workload or workload group, defining high priority workloads that preserve fairness and balancing the workload selection based on current status of the batch system, validation status, and the workload ratios.

21 Claims, 12 Drawing Sheets

AUTOMATED WORKLOAD SELECTION

BACKGROUND OF THE INVENTION

This disclosure relates to a method and apparatus for controlling the workload of individual computing systems in an information handling system in which incoming work requests are placed in a queue for processing by one or more computing systems.

Integrated circuits (ICs) are becoming more complex with increased density. Consequently, IC testing is also becoming more complex according to the complexity and density of ICs. An automated workload selection system (workload management system) submits jobs (compute intensive workloads, such as chip design) to the batch processing system to keep the batch processing system continually full of useful work. However, today's algorithms have several problems.

A batch processing system such as Load Leveler or LSF has the ability to receive submitted jobs and run the jobs on many computing systems simultaneously. When a machine is available, the job executes. If all machines in the batch system are running jobs, extra jobs are placed in a queue for execution in the future. Batch systems with a large number of computers represent a significant investment in capital. Keeping the batch system full of jobs (such that none of the computers in the processing system is idle) offers advantages such as increased efficiency and utilization.

Workload management systems in which incoming work requests are placed in a queue for assignment to an available computing system are well known. Since the frequency at which the incoming requests arrive may not be readily controlled, controlling the number of servers provides one means of controlling system performance (measured by queue delay or the like) in such a queued system. Thus, it is known in the art to start an additional server when the length of the queue being served reaches a certain high threshold or to stop a server when the length of the queue being served reaches a certain low threshold. While such an expedient may achieve its design objectives, it is unsatisfactory in a system in which other units of work besides the queued work requests are contending for system resources. Thus, even though providing an additional server for a queue may enhance the performance of the work requests in that queue, providing such a server may so degrade the performance of other units of work being handled by the system that the performance of the system as a whole deteriorates.

Most current operating system software is not able to take over the responsibility for managing the number of servers according to the end-user oriented goals specified for the work requests and considering other work with independent goals running in the same computer system.

BRIEF SUMMARY OF THE INVENTION

The following description and claims further describes systems and methods associated with embodiments of the present disclosure. Advantages and features of embodiments of the present disclosure may become apparent from the description, accompanying drawings and claims.

Embodiments on the present invention provide a system operable to allocate workload within a batch processing system. This system includes one or more servers and a batch processing system communicatively coupled to the one or more servers. The one or more servers are operable to receive a work request and execute work management processing software. The work management processing software validates individual workloads, determines the number of workloads to select and then selects a set of valid workloads to be processed. This system then may submit the set of valid workloads to a batch processing system. The batch processing system has a number of computing resources wherein the work management processing module directs workloads to individual computing resources based on a variety of criteria within the batch processing system. The workloads may include one or more parent workloads and one or more child workloads. Embodiments provide an N-level tree hierarchy such that one child workload may be a parent to several other child workloads.

Another embodiment on the present intervention provides A computer implemented method of allocating workloads within a batch processing system. This method begins by receiving a work request at a work management software module executed on a server. This work request may involve many different workloads. The workload work management processing software determines the number individual validated workloads to select. The batch processing system having a number of computing resources then may receive a selected set of valid workloads to be processed that have been submitted. Individual workloads may be directed to individual computing resources.

Yet another embodiment of the present invention provides another method of automatically allocating workloads to a batch processing system. This method involves receiving a work request and validating individual workloads. The workloads may be one or more parent workloads having one or more child workloads. Individual child workloads may serve as parents to sub child workloads. The batch processing system receives a selected set of valid workloads for processing after the number of workloads to be selected has been determined. The work management software may further allocate and reallocate computing resources to child workloads within a first parent workload without impacting an allocation of computing resources within a second parent workload.

Further embodiments of the present invention may halt processing within a first parent workload when a number of failures associated with child workloads within the first parent workload exceed a threshold value. The computing resources assigned associated with the halted first parent workload may be reassigned to remaining parent workloads. Embodiments of the present invention also facilitate intelligently executing portion recovery of computing resources assigned to the remaining parent workloads when processing within the first parent workload resumes. These workloads may be associated with complex testing such as the simulation test on an integrated device or circuit.

BRIEF DESCRIPTION OF THE SEVERAL VIEWS OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE INVENTION

The FIGS. illustrate embodiments of the present disclosure, like numerals used to refer to like and corresponding parts of the various drawings.

Embodiments of the present disclosure provide a server based software application that can continuously allocate computing resources between projects, groups and various workloads. These embodiments allow not only the allocation of computing resources but associated manpower associated with groups. This will result in both high CPU utilization as well as manpower utilization.

Previously one person might be responsible for submitting various computing jobs to a batch processing system. These jobs, typically processed overnight, provide results the next day. Embodiments of the present disclosure provide an automated allocation of computing resources in a batch processing system that considers not only projects through workloads but also as the result of simulations. By identifying errors or failures and comparing the number of errors or failures to a threshold level, further simulation on the batch processing system relating to that group may stop when the threshold level of errors associated with a certain project or group compares unfavorably to the number of errors or failures. This allows the manpower required to address these failures and the computing sources used to identify additional related failures to be reallocated. This utilization and reallocation results in a more effective utilization of manpower and processing power.

Figure 1:
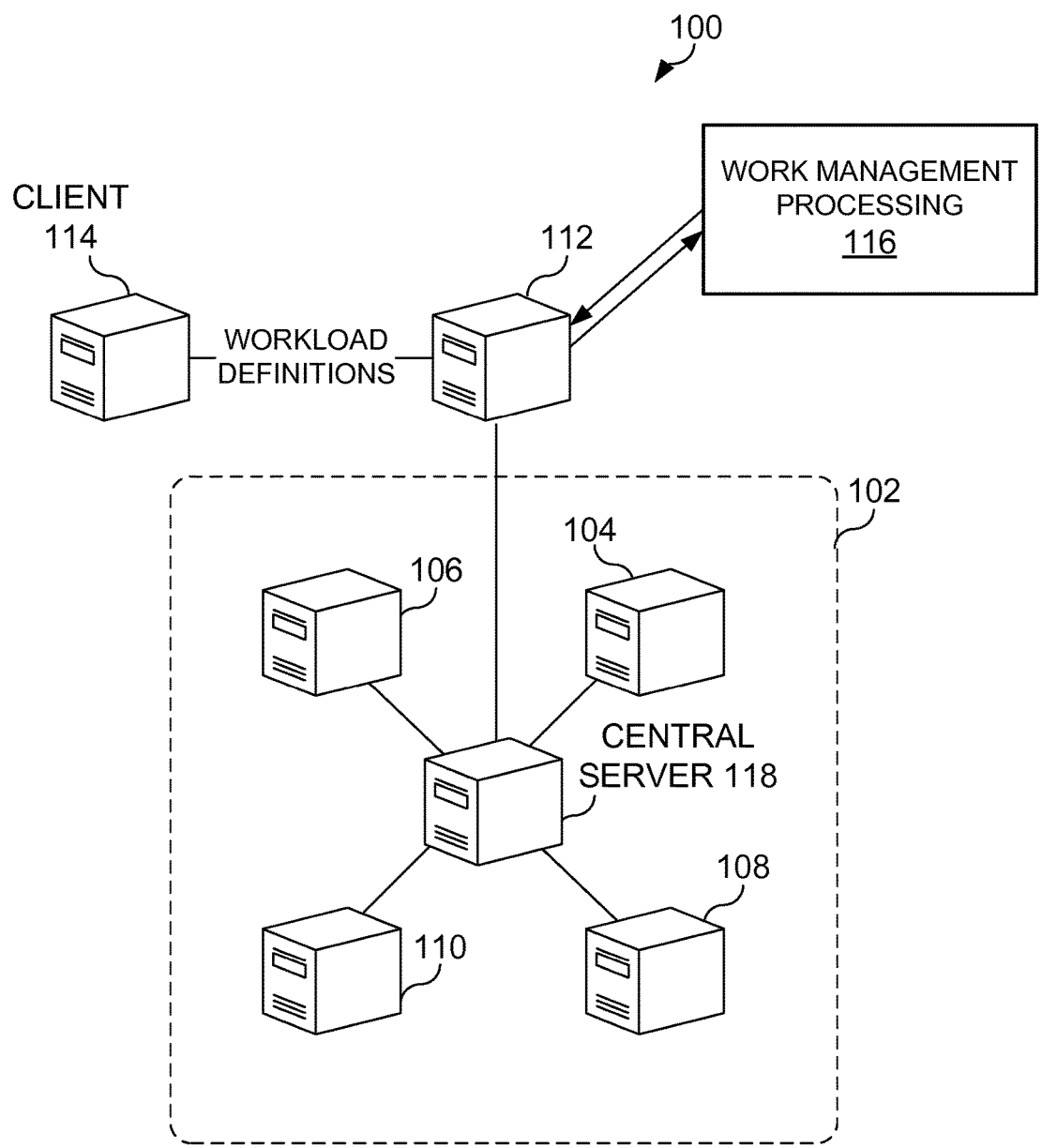
FIG. 1 illustrates the environment and the key features of the present disclosure for an exemplary embodiment.

Workload management is a concept whereby units of work (jobs, processes, threads, etc.) that are managed and provided system resources. A net positive effect in performance as determined by predefined performance criteria may result by reassigning resources from one group to another. Workload management of this type differs from the run-of-the-mill resource management performed by most operating systems in that the effect on the work units to which the resources are reassigned, but also by the effect on the work units from which they are taken determines the assignment of resources FIG. 1 illustrates the environment and the key features of the present disclosure for an exemplary embodiment comprising a batch processing system or cluster 102 of interconnected, cooperating computing resources such as computer systems 104, 106, 108, and 110, and servers 112 and 118. Various clients 114 define workload definitions to server 112. The server continually executes a workload management selection processing module 116. The workload management processing module selects workloads based on the batch processing status, previous workload results, hierarchical priorities, and workload configuration settings. The selected workloads are submitted the batch processing system or cluster 102 that includes cooperating computer systems 104, 106, 108, and 110, and optional central server 118. The environment of the disclosure is that of a queue of work requests and a pool of servers distributed across the cluster that service the work requests. The disclosure allows management of the number of cooperating computer systems based on the performance goal classes of the queued work and the performance goal classes of competing work in the systems 100. Those skilled in the art will recognize that any number of cooperating computer systems and any number of such queues and groups of servers 112 may be used without departing from the spirit or scope of the disclosure.

Figure 2:
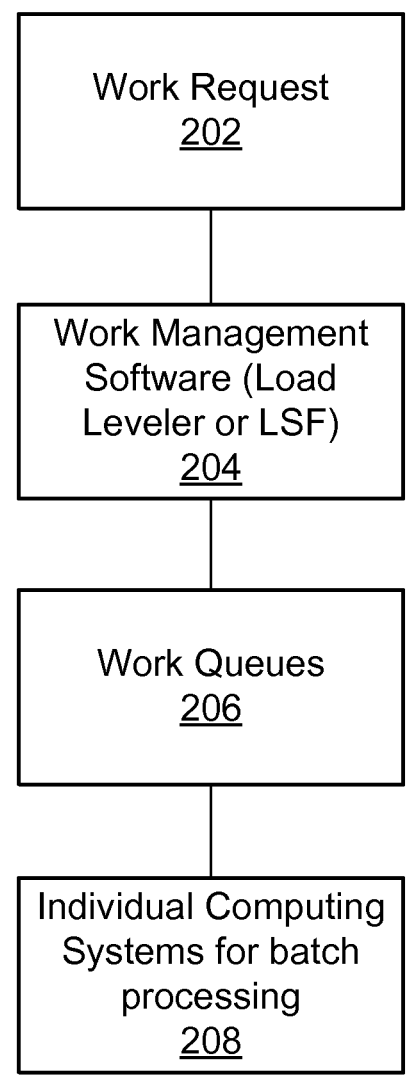
FIG. 2 is a flow diagram of a client work request 202 from a network (see FIG. 1) in accordance with embodiments of the present disclosure.

FIG. 2 is a flow diagram of a client work request 202 from a network (see FIG. 1) to which system 100 is connected, to an address space or individual computing system 208 managed by the workload manager 204. Work management software 204 is a component inside/outside of the operating system of the individual computing systems, which uses operating system services to define one or more queues 206 to a workload manager (WLM) 204 and to insert work requests 202 onto these queues. The workload manager 204 ensures that requests provided to those individual computing systems have affinity to tests to be performed.

For compute intensive workloads, such as chip design, an automated workload selection system software layer submits jobs to the batch processing system to keep the batch processing system continually full of useful work. However, today's algorithms have several problems. Current algorithms do not address the diverse set of workload validation and distribution requirements driven by many large and small teams sharing a common batch processing system. Thus, current algorithms may result in sub-optimal workload selection and inadvertent impact on other teams' workload portion. Current algorithms may also result in a batch processing system having an unacceptably high queue depth. Unacceptably high queue depths may lead to high latencies to: realize workload portion distribution or validity changes; test a new workload; and resume a previously stopped workload. Further, even if the batch processing system queue depth falls to an acceptable level, current algorithms and workload validation schemes do not address workload portion recovery algorithms.

The testing infrastructure associated with testing complex integrated systems is no longer an instance of merely testing a set of instructions. Rather testing, particularly in the hardware environment, has become a testing based on a directed random template wherein random seeds maybe tested repeatedly tested and yield different results.

The complexity of managing numerous teams, many workload validation and distribution requirements, and dynamic workload events severely challenge current implementations. Thus, these implementations do not enable the user to understand the impact of distribution requirements on other workloads, and both predict and bound the impact of the distribution change on quality of service.

Embodiments of the present disclosure provide algorithm(s) to validate and select workloads to submit to a batch processing system. The algorithm uses the combination of: (1) an n-level tree hierarchy to represent the workload portions; (2) selectable workload validation algorithms at any level of the tree; (3) the isolation of workload validation, such that validation impact may be limited to a single workload group's children; (4) giving resources assigned to an invalid workload's to the workload's peers; (5) the solution provides for maximum limits on workload and workload groups if a user does not want a peer overtaking too much of the batch processing system; selectable workload selection algorithms at any level of the tree; isolate the portion distribution of a workload or workload group to its parent's children; provide portion alteration limits and algorithms so external events like coverage can modify the portion distribution of a workload groups children; provide the user with a high priority workload group which: can be added anywhere in the tree; and is isolated to only steal selections from its sibling's portions; to achieve a selection system that enables many large and small teams to share a common batch processing system that dynamically responds to changing priorities, job lengths and job results.

Figure 3:
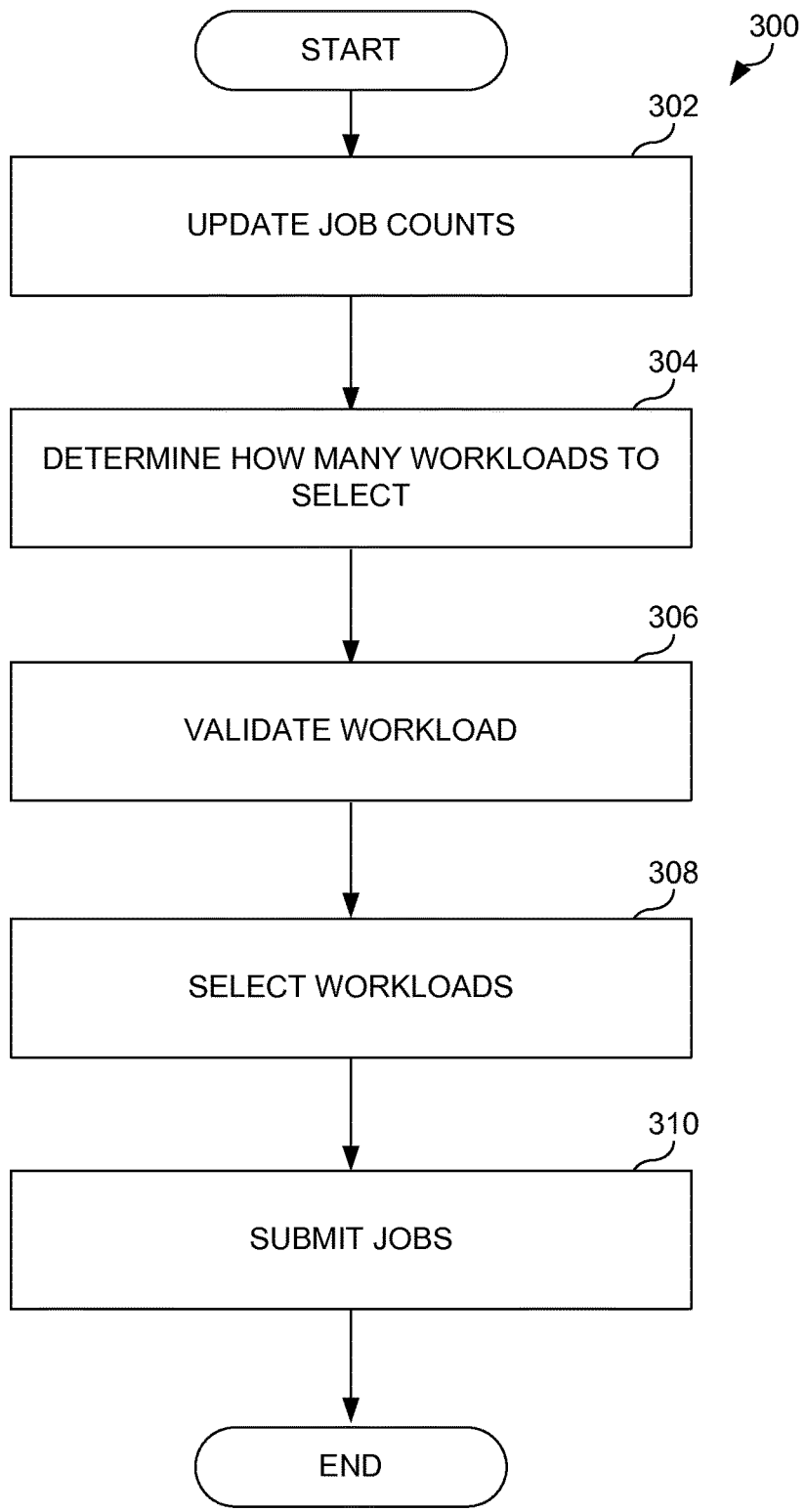
FIG. 3 is a logic flow diagram for the submission of jobs to the batch processing system for compute intensive workloads, such as chip design in accordance with embodiments of the present disclosure.

FIG. 3 is a logic flow diagram for the submission of jobs to the batch processing system for compute intensive workloads, such as chip design. The jobs or workloads may be organized into an n-level tree hierarchy. This method may be executed using an automated workload selection system software layer to submit jobs to the batch processing system such that the system may keep the batch processing system continually full of useful work. Operations 300 begin with block 302. The processes of block 302 compute an updated job counts. In block 304, the workload management server application may determine how many workloads to select. Processes of block 306 then validate these workloads. Validation of workloads may include the identifying of those workloads that have already reached a predetermined or threshold level of failures. Prioritizing lower (deprioritizing) or not validating workloads having numerous failures allows manpower associated with addressing those failures to be effectively utilized such that further simulations are not run on a known failing system. Block 308 selects workloads from the set of validated workloads. In block 310, the workload management application may submit jobs to the batch processing system. The submission of jobs to the batch processing system may include a wrapper or header associated with the jobs that specify the processing requirements associated with the job. Specifying the processing requirements ensures the matching of systems having the proper computing resources to jobs that require those resources.

Figure 4:
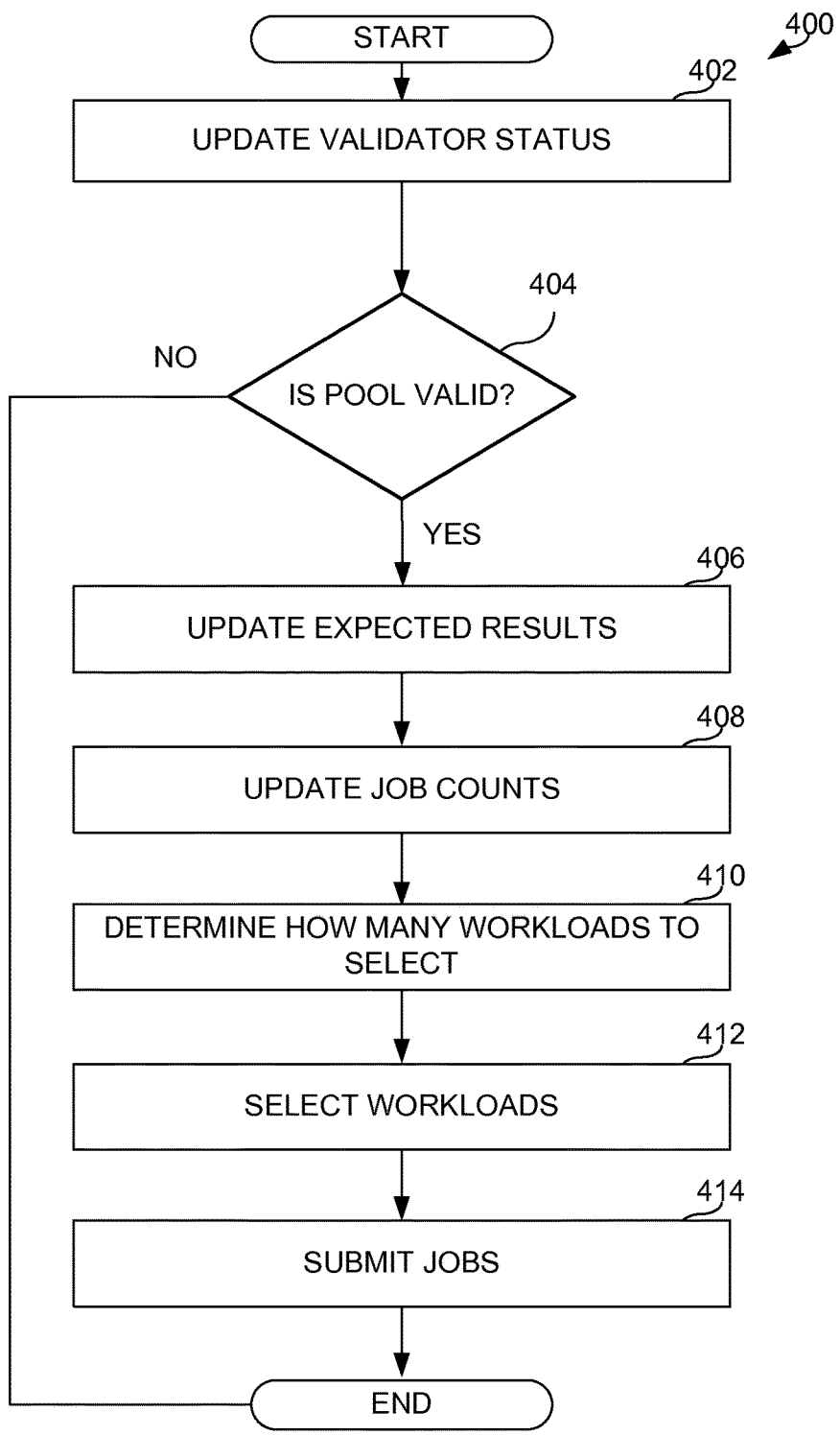
FIG. 4 is a logic flow diagram associated with an algorithm to validate and select workloads to be submitted to a batch processing system in accordance with embodiments of the present disclosure.

FIG. 4 provides a logic flow diagram associated with an algorithm to validate and select workloads for submission to a batch processing system in accordance with embodiments of the present disclosure. For example, a workload or parent workload could be designated invalid because it had too many fails or because the time was during the weekend hours. The disclosure provides that one or more validator algorithms can be associated with any workload or parent workload in the workload hierarchy. Operations 400 begin with block 402. Processes within block 402 update validator status. Decision point 404 determines whether the pool of workloads is valid. The process then ends when the pool is not valid. Otherwise, block 406 computes an update for expected results when the pool is valid. Block 408 updates the number of job counts. Then block 410 determines how many workloads to select. Block 412 selects workloads for submission as jobs in block 414.

This algorithm uses an N-level tree hierarchy to represent workload portions. Previous hierarchy systems may have been limited to a predetermined number of hierarchies such as high priority and low priority workloads. The N-level tree hierarchy used to represent workload portions allows embodiments of the present disclosure to address the inadvertent impact associated with killing one group of workloads when new workloads for that group are presented. Prior solutions allowed the workloads of other groups to subsume all the resources when an interruption of one groups work occurred. This resulted in no resources being available when a group that had previously experienced interruption recovers.

Updating validator status as shown in FIG. 4 simply walks the tree. Updating validator status can be an expensive operation. Updating validator status executes first and then the following steps can query the results. The algorithm can handle submitting to multiple batch processing systems (pools) which improve decision making with remote batch processing systems.

The Update Expected Status step (block 406), a recursive algorithm similar to Select Workloads, will be described below. Update Expected Status runs through a calculation of what the user should expect to see based on the current portion ratios and validation status. However, since this workload selection algorithm must wait for jobs to complete on the batch processing system before submitting new jobs, the select workloads algorithm extends this Update Expected Status algorithm and accounts for current jobs in the batch processing system. Various selection algorithms can select the workloads of a parent workload's children. In addition, users may assign the various selection algorithms to any parent workload in the workload hierarchy. For example, the selection could be random, round robin, or weighted based on how each workload compares against an arbitrary criteria.

Figure 5:
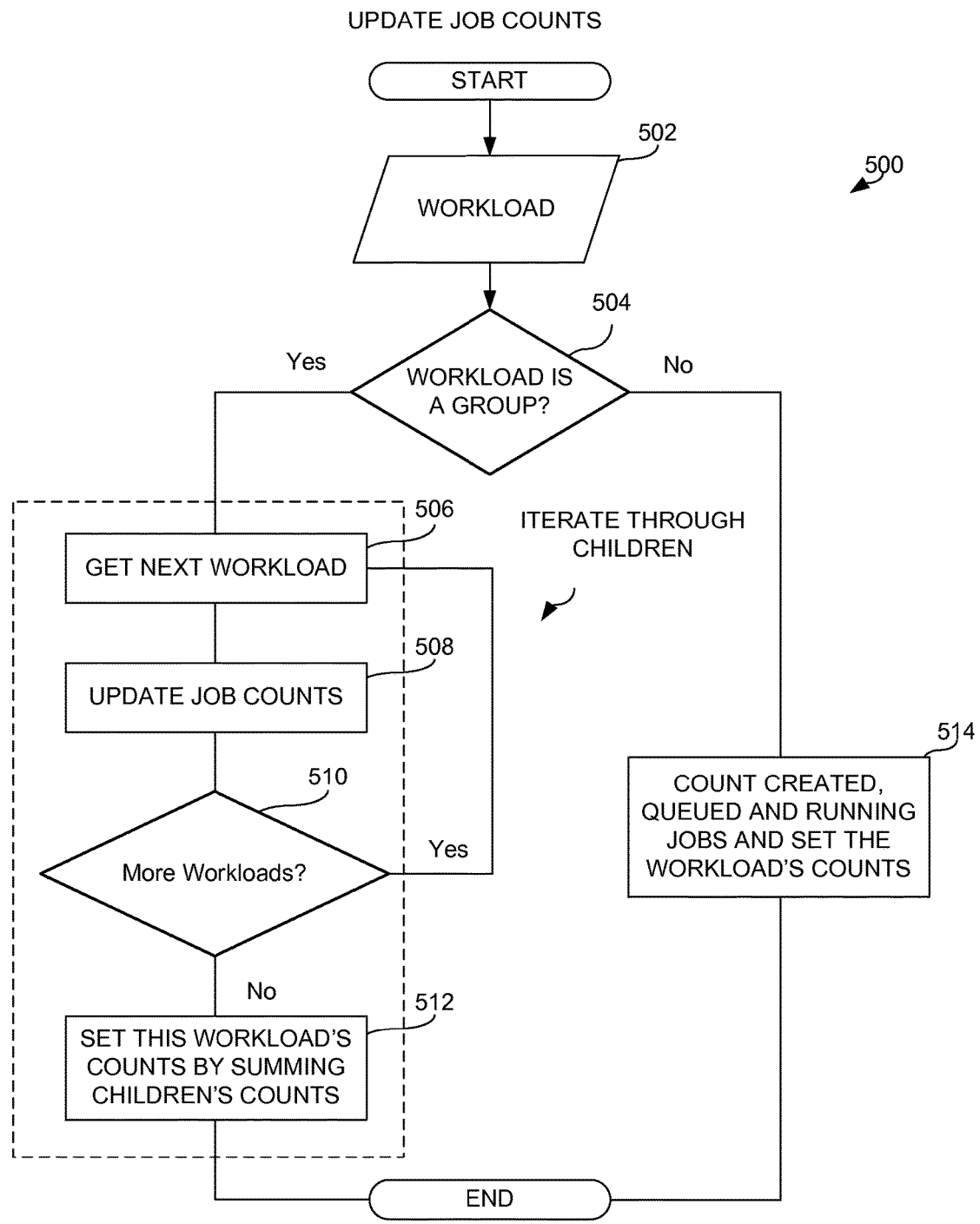
FIG. 5 provides a logic flow diagram associated with Update Job Counts block of FIG. 4 in further detail in accordance with embodiments of the present disclosure.

Update jobs counts (block 408) uses the following algorithm to count jobs for workloads and workload groups. FIG. 5 describes one embodiment of this algorithm in further detail. First block 410 determines how many workloads to select by a variety of algorithms and could be as simple as seeing the maximum jobs allowed on the pool compared to the current jobs on the pool.

Embodiments of the present disclosure provide one benefit in the ability to update when expected results may occur. Thus, a user may receive an update relating to when simulation results will be available based on dynamic changes in the jobs submitted and potentially removed from queue. At Decision Point 404, the question of "is the pool valid?" relates more directly or may be better stated as "is the batch system to which the jobs will be submitted up and available?"

Embodiments of the present disclosure may provide a heuristic process wherein jobs may be related. If the simulation results of a particular job results in too many failures, unfinished jobs in queue related to the simulation results having too many failures may be ended such that processing time need not be wasted on a faulty design. Ending processing of these unfinished jobs allows reallocation of resources to other jobs not related or unrelated to the failing simulation. These jobs may be part of different workloads or projects but the relationship between jobs may be defined such that it is possible to end one job based on failure results in one or more related jobs. Thus, all testing related to the simulation of one particular revision or model may be concluded.

The work management processing module may allocate and reallocate computing resources taking into account current job status and optional maximum workload limits and distribute any unused job allocations to those in the hierarchy most closely related. If that distribution is not possible, the work management processing module may offer unused job allocations to less closely related workload groups.

FIG. 5 provides a logic flow diagram associated with Update Job Counts block 408 of FIG. 4 in further detail in accordance with embodiments of the present disclosure. Operations 500 begin with block 502, where block 502 determines whether the workload is a leaf or a group. If the workload is a group, as determined at Decision Point 504, several process iterations identify all the individual jobs associated with the group. If the workload is not a group at Decision Point 504, block 514 determines the updated job count based on queued and running jobs as well as the current workloads group. It should be noted that a leaf node may contain more than one job. For example, a leaf node may contain 20,000 jobs. Similarly, a group may contain more than one leaf nodes. Returning to Decision Point 504, if the workload is a group, then block 506 examines the workload and determines the number of jobs associated with that group workload. Decision Point 510 identifies whether or not additional workloads exist. If no more group workloads exist, then the instant workload's count results from summing the children's counts in block 512. However, if additional workloads are present, the process will iterate through all of the children workloads until all the children counts have been identified and summed in block 512

Figure 6A:
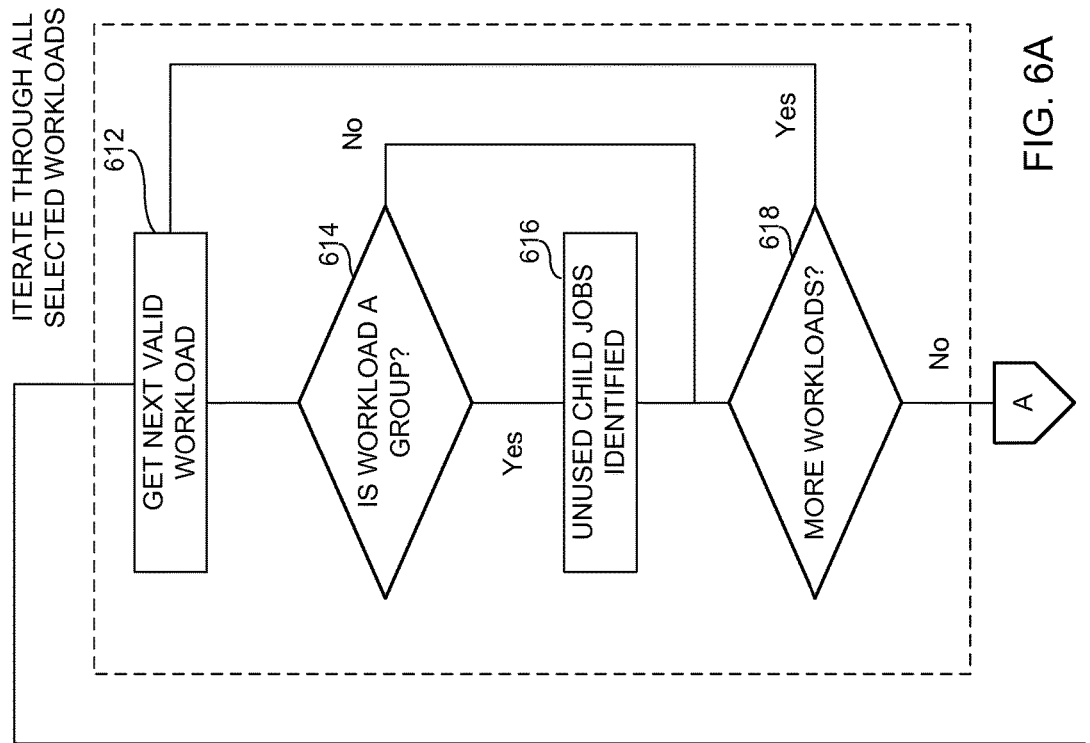
FIGS. 6A and 6B provide a logic flow diagram that relates to selecting work loads in more detail than that of block of FIG. 4 in accordance with embodiments of the present disclosure.
Figure 6A:
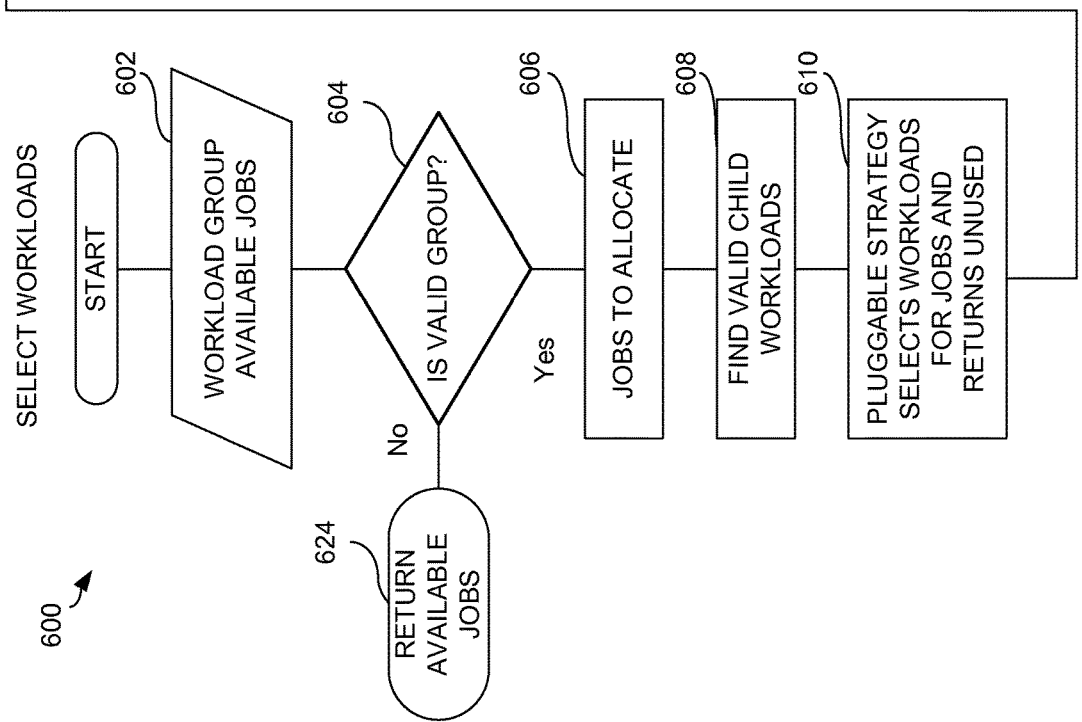
Figure 6B:
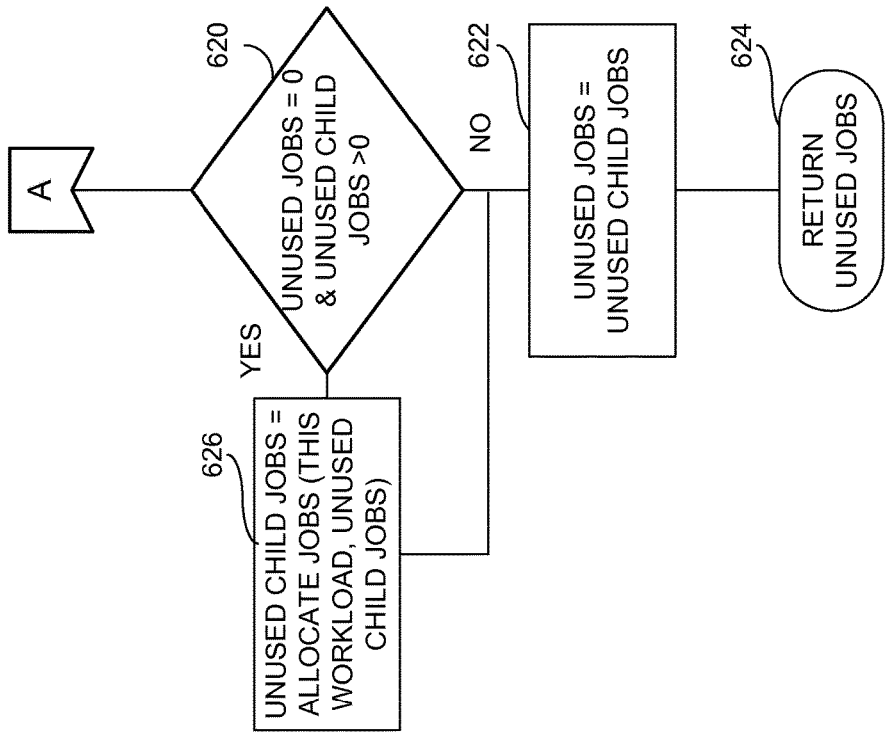

The key section of the algorithm selects workloads and dynamically rebalances portions based on validators. The algorithm gives the user optional maximum limit definitions to prevent workload groups from completely overtaking portions for a temporarily invalid workload sibling. FIGS. 6A and 6B describe one select workloads recursive algorithm used by embodiments of the present disclosure.

FIGS. 6A and 6B provide a logic flow diagram that relates to selecting work loads in more detail than that of block 412 of FIG. 4 in accordance with embodiments of the present disclosure. Operations 600 begin by navigating through a workload group of available jobs in block 602. If the group is not valid, block 624 returns this number of jobs as unused or available jobs in block 624. If the group is valid in block 604, block 606 checks the available jobs against an optional maximum limit. This prevents a team that may want to subsume the queue. Block 608 then finds the valid child workloads. The current jobs plus the previously allocated jobs should be less than (<) the maximum number of jobs. Block 610 introduces the concept of a pluggable strategy that selects the workloads and returns the unused jobs. This pluggable strategy allows a workload to use a particular set of rules of how a workload and child workloads or related workloads would be handled. These rules may employ a round robin, a weighted round robin or other strategy.

Blocks 612 through 618 iterate through the selected workloads. Block 612 retrieves the next valid workload. Decision point 614 then determines whether the workload is a group. If it is a group then block 616 updates the unused child jobs by executing a recursive algorithm on the child workload group. If the workload is not a group the process continues to decision point 618 where decision point 618 determines whether or not there are more workloads. If there are more workloads, the process reiterates continuing to get the next valid workload in block 612, otherwise the process continues from block 618.

The process flow diagram of FIG. 6A continues with FIG. 6B. At decision point 620 if the unused jobs is equal to zero and the unused child jobs is greater than (>) zero, then block 626 again calls the recursive algorithm to determine if other children can use the job slots. The process then returns any unused jobs. At decision point 620, when the unused jobs is not equal to zero and/or the unused child's jobs is not greater than (>) zero, then the unused jobs equals the unused child jobs. Operations 600 identify unused jobs and return the unused jobs such that the unused jobs can be reallocated. Selected workloads translate into jobs for submission to the batch processing system.

Figure 7A:
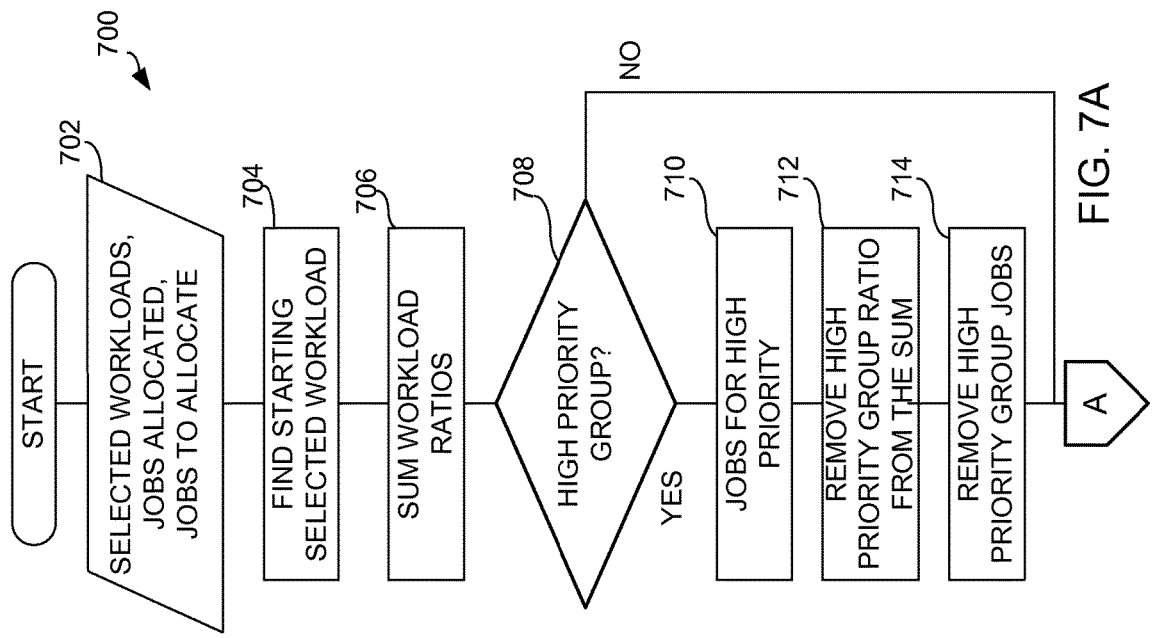
FIGS. 7A and 7B provide a logic flow diagram in accordance with embodiments of the present disclosure that employ a round-robin strategy as the pluggable strategy identified in FIG. 6A.
Figure 7B:
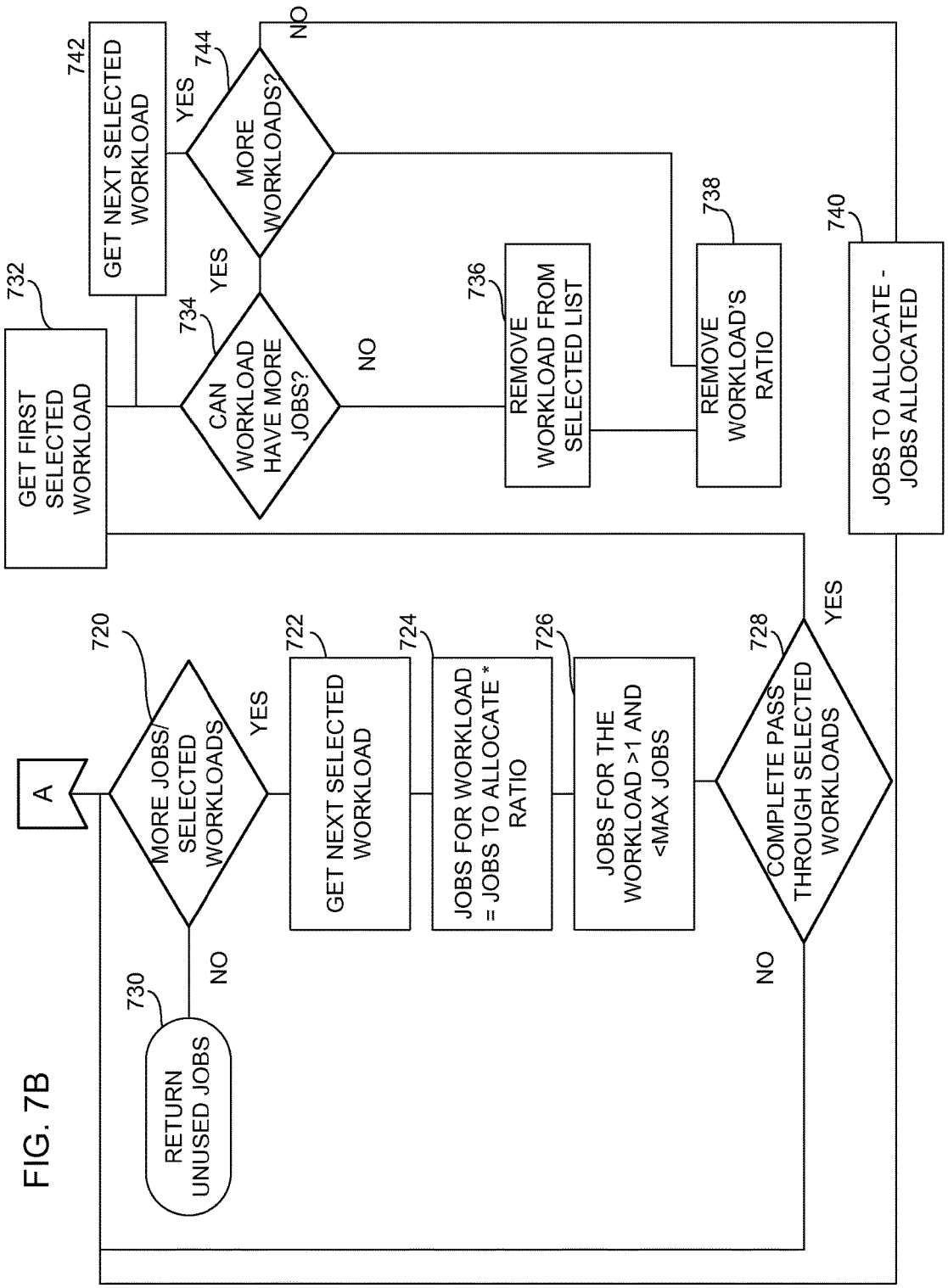

FIGS. 7A and 7B provide a logic flow diagram in accordance with embodiments of the present disclosure that employ a round-robin strategy as the pluggable strategy identified in FIG. 6A. This allows priority differentiation of workloads to be addressed. A high priority workload group can be inserted anywhere in the workload hierarchy. The work management processing module only allows the high priority workload to take a configurable amount from peer workloads under the same parent workload. This allows high priority workloads quick service but within the fairness across all workload groups which for example could represent multiple projects competing for the same batch system's resource.

In this hierarchy, a high-priority group can take a parameterized parameter ratio of its children groups. Thus, one parent can have a high-priority workload take priority over related and child workloads up to a certain percentage. This strategy allows processing the high-priority workload without affecting unrelated workloads. Thus, a high-priority workload will not impact the work of other workgroups. The ratios may also prevent a child workload from being starved.

The pluggable strategy allows a parent workload to determine the rules applied to all of its children workloads. If there is a high-priority group, special handling is required in order to determine how much or how many jobs the high-priority job can take from its siblings. The total number of jobs available to the siblings does not include the number of jobs removed from the siblings and reallocated to the high-priority job. After removing the reallocated jobs, the processes use the new total number of jobs allocated to the siblings to reallocate jobs to the siblings.

In FIG. 7A, Operations 700 begin with block 702. Block 702 allocates selected workload jobs. Block 704 identifies the selected workloads. Then block 706 sums the workload ratios. Block 708 determines whether there is a high-priority group. If there is a high-priority group, block 710 determines the number jobs of the high priority as a function of the number of jobs to allocate and the high-priority ratio. Block 712 removes the high-priority ratio assigned from the groups' ratio to sum. Block 714 removes the jobs for high priority from the jobs available for allocation.

In FIG. 7B the process continues. Block 720 determines whether or not there are more jobs (jobs, job slots, or jobs to allocate/count) and workloads to be allocated. If there are not any more, block 730 returns unused jobs to the pool of available jobs. Otherwise, block 722 retrieves the next selected workload. Block 724 sets the number of jobs for the workload as a function of the jobs to allocate and the workloads ratio wherein the workloads ratio may have been adjusted previously by removing the high-priority component of the ratio. Block 726 shows that the jobs for the workload must be greater than one (>1) and less than (<) the workload's max jobs. Block 728 then determines whether all the selected workloads have been processed. If they have not the process returns to block 720.

Otherwise, the process continues with block 732 retrieving a first-selected workload. Decision Point 734 determines whether the workload can have additional jobs. If the workload cannot have more jobs then block 736 removes the workload from the selected list. Then block 738 removes the workloads ratio from the ratio sum. Then Decision Point 744 determines whether more workloads are to be processed. If more workloads are to be processed, block 742 retrieves the next-selected workload and the process then returns to block 734. Otherwise, block 740 computes the job to allocate as the difference between the jobs available for allocation and the jobs previously allocated.

Embodiments of the present disclosure also provide an algorithm to minimize batch processing queue depth. The automated workload selection system algorithm takes a finite amount of time to pick the next job(s) to submit, and an additional amount of time to submit the job to the batch farm. This execution time limits the rate at which jobs may be submitted to the batch farm, which is defined as the submit rate. If the submit rate is greater than (>) or equal to the job completion rate, then all computers in the batch farm will be utilized. In addition, customers may change the workload configuration, and the system must be able to respond to those changes in a reasonable amount of time. The work management processing module detects the job completion rate and dynamically increases or decreases the time between re-evaluating the entire tree or set of workloads and parent workloads thereby keeping the number of queued but not running jobs in the batch system very low to avoid high latency penalties of changing priorities or reacting to invalid workloads.

The automated workload selection system continuously monitors the completion rate and automatically adjusts the submit rate in order to keep the batch system full. The automated workload selection system can adjust how often the algorithm to pick the next job(s) runs, and how many jobs to submit in that run. For example, if jobs are completing at a rate of one per hour, the automated workload selection system need only run once per hour and submit one job. If the automated workload selection system detects that the completion rate is increasing, the automated workload selection system can either reduce the time between runs, or increase the number of jobs submitted per run.

Figure 8:
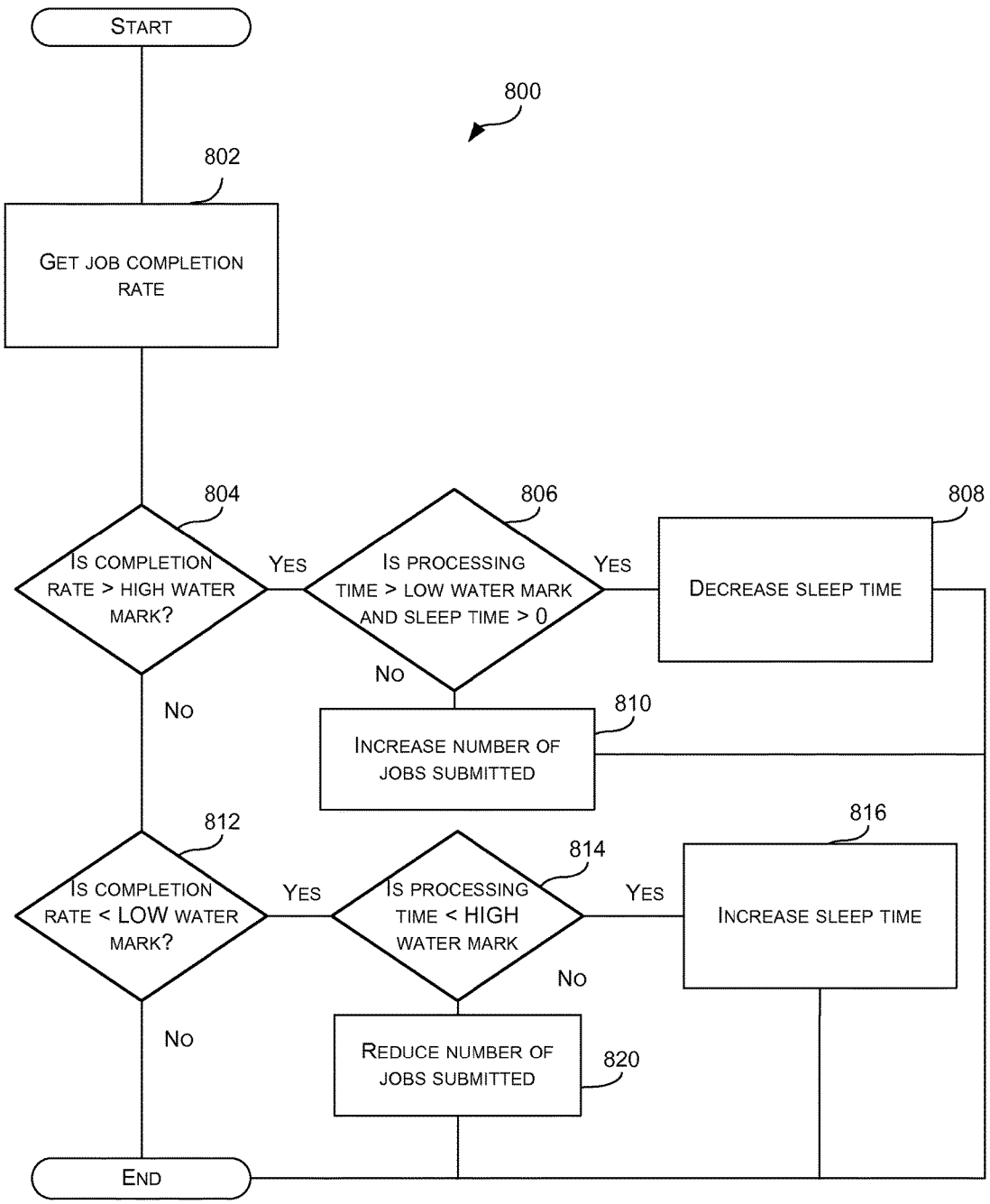
FIG. 8 provides a logic flow diagram in accordance with embodiments of the present disclosure associated with an algorithm to minimize batch processing depth.

FIG. 8 provides a logic flow diagram in accordance with embodiments of the present disclosure associated with an algorithm to minimize batch processing depth. Operations 800 begin with block 802 retrieving the job completion rate. Decision point 804 determines whether the job completion rate exceeds the high water mark. If the job completion rate does, decision point 806 determines whether processing time is greater than (>) the low water mark and the sleep time is greater than (>) zero. If so, then block 808 decreases sleep time. Otherwise, block 810 allows the number of jobs available for submission to increase. Returning to block 804 if the completion rate is less than (<) the high water mark the process continues with block 812 where block 812 determines whether or not the completion rate is less than (<) the low water mark. If the completion rate is less than (<) the low water mark, and the processing time is less than (<) the high water mark at decision point 814, then block 816 may increase the sleep time. Otherwise, block 820 reduces the number of jobs available for submission.

In a system with a highly variable completion rate, the automated workload selection system may need to submit upwards of several hundred jobs per second at times to keep the batch system fully utilized. The time required to interact with the batch system to submit a job may prevent the automated workload selection system from achieving the required submit rate. To overcome this problem, the automated workload selection system may submit one or more helper job(s) to the batch system that, in turn, submits jobs to the batch system on behalf of the automated workload selection system. These helper jobs may automatically terminate when the completion rate falls, or additional helper jobs may automatically start when the completion rate increases.

Figure 9:
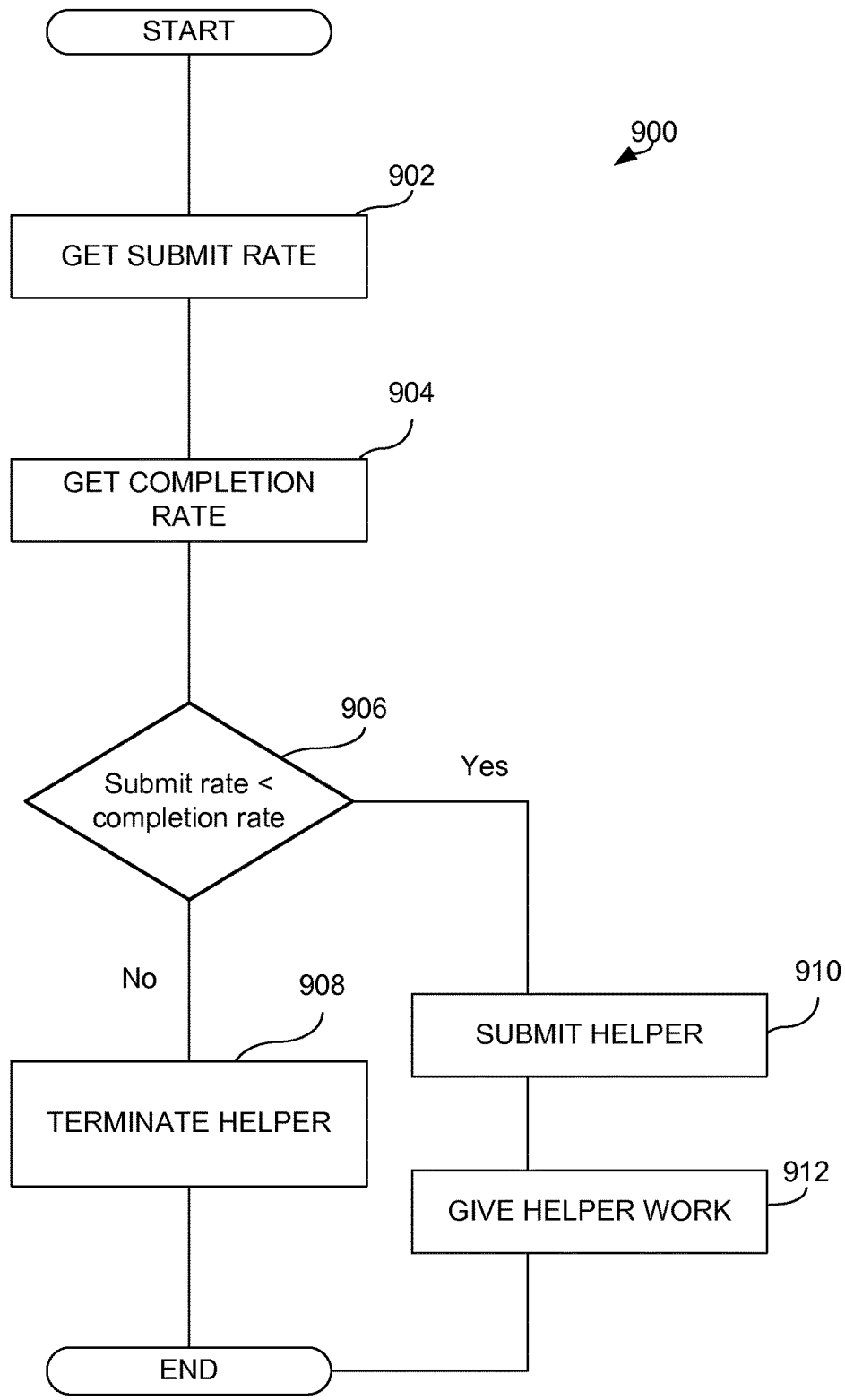
FIG. 9 provides a logic flow diagram in accordance with embodiments of the present disclosure associated with an algorithm to address a highly variable completion rate and job submission rate.

FIG. 9 provides a logic flow diagram in accordance with embodiments of the present disclosure associated with an algorithm to address a highly variable completion rate and job submission rate. The work management processing module may detect the job completion rate the job submission rate and create or terminate job submission helpers (a new process or another server for example) to increase or decrease the rate of submissions to match the completion rate thereby ensuring that the work management processing module always keeps the batch systems busy with work. Operations 900 begin with block 902 where the submit rate is retrieved. Block 904 then retrieves the completion rate. Decision point 906 determines whether the completion rate exceeds the submission rate. If the completion rate exceeds the submission rate then a submission helper processing module activates in block 910. This module may be supplied work in block 912. Otherwise, if the submission helper processing module is active the processing module may terminate in block 908.

Embodiments of the present disclosure also provide an algorithm to address workload portion recovery. Based on configuration changes or other events such as a workload completing, other workloads can take advantage of the portion of the batch processing system that is now unused. The problem occurs when the configuration changes or the completed workload starts up again. Historically, the workload starting up must wait for jobs to finish on the batch processing system before new workloads have a chance to be selected. This causes delays in starting the workload. Severity of this problem increases if the batch processing system's job completion rate is low. An alternative solution of killing all excess jobs of a workload is rarely an acceptable solution, as certain workloads require protection from termination due to job importance or job length.

Embodiments of the present disclosure provide a number of portion recovery algorithms that offer varying degrees of aggressiveness. Examples include: 1) Killing queued, but not running, jobs in the batch processing system from workloads that exceed their portion (Variations on this algorithm include: killing the oldest queued jobs because the newly queued ones would have the most recent workload configuration data; and killing the newest queued jobs); 2) Killing both queued and running jobs in the batch processing system from workloads that exceed their portion; 3) Waiting a programmable amount of time before killing jobs via method 1 or 2 in the batch processing system from workloads that exceed their portion; and 4) Killing up to a certain number of jobs per unit of time in the batch processing system from workloads that exceed their portion.

Figure 10:
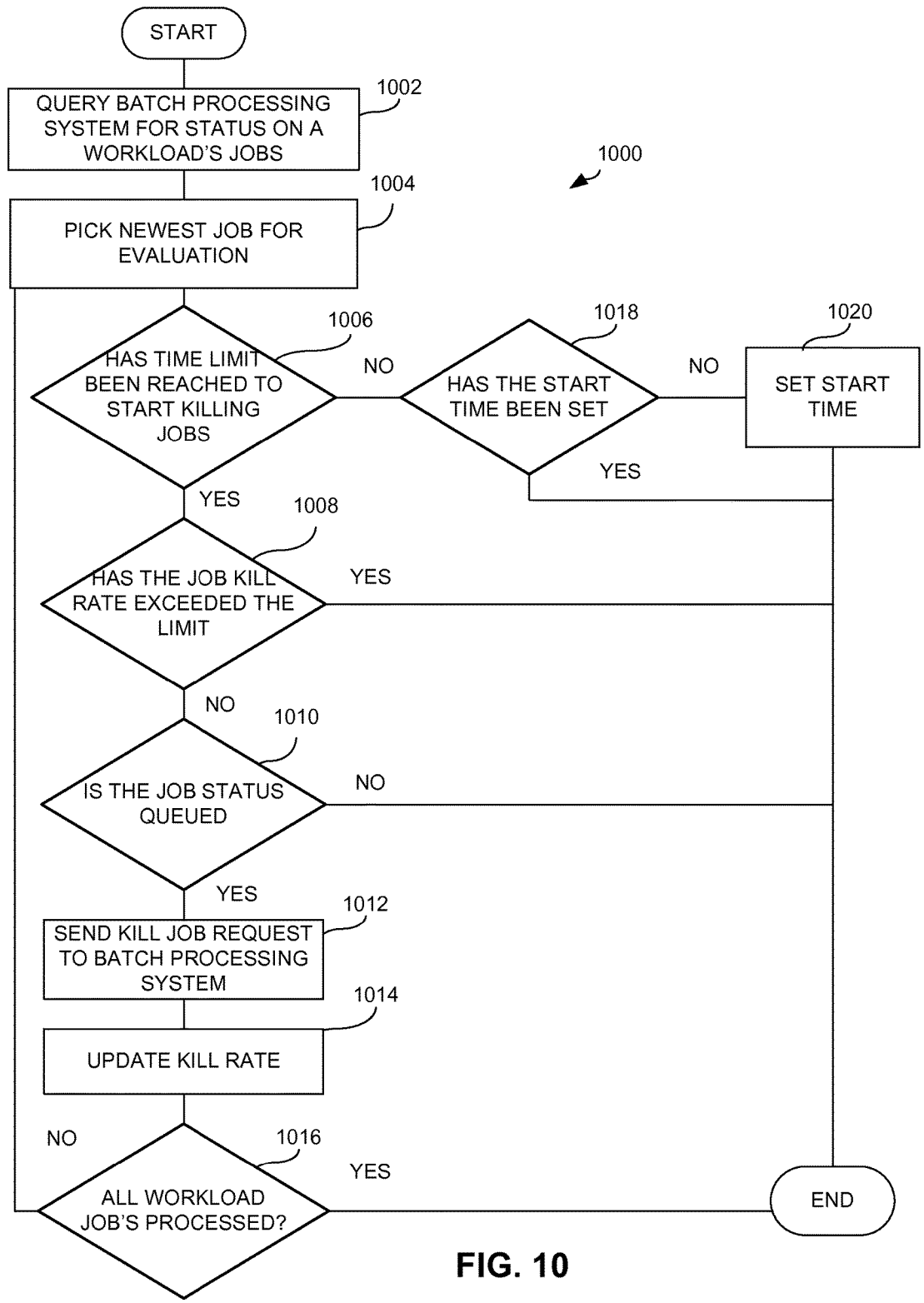
FIG. 10 provides a logic-flow diagram associated with an algorithm to address workload portion recovery in accordance with embodiment to the present disclosure.

FIG. 10 provides a logic flow diagram associated with an algorithm to address workload portion recovery in accordance with embodiment to the present disclosure. Workload portion recovery may occur when a previously terminated workload returns to service and the available workload allocation associated with the previously terminated workload had been returned to the batch processing system as being unused. The present disclosure provides a process to reclaim that workload's allocation. This allows prior to the configuration change, other workloads to take advantage of the portion of the batch processing system that was unused. Operations 1000 begin with block 1002 querying the batch processing system for status on workloads jobs. These operations allow other jobs associated with siblings to terminate if necessary. Block 1004 picks the new job for evaluation. Decision Point 1006 makes a determination as to whether a time limit has been reached to start killing jobs. If not, block 1018 questions whether a start time for killing of jobs has been set. If not block, 1020 starts the set time to kill jobs. If the time limit has expired at Decision Point 1006 then Decision Point 1008 determines whether the job kill rate has exceeded the job kill rate limit. If the job kill rate has been exceeded then this recovery algorithm is complete. Otherwise the process continues. Decision Point 1010 determines whether the job status has been queued. If the job status has not been queued then the process completes. Otherwise, the kill request for the job may be sent to the batch processing system in block 1012. Block 1014 updates the kill rate. This process continues iteratively at Decision Point 1016 where if the entire group of workload jobs has not been processed the process selects the next newest job by returning to block 1004. Otherwise, the recovery algorithm is complete. This insures that short-running jobs may be completed while longer running jobs may be removed to facilitate the reallocation of jobs to an existing workload that is being recovered.

Embodiments of the present disclosure also provide a user interface (UI) for the users to associate one of the portion recovery algorithms with a workload. This allows users to be aggressive in killing jobs in some workloads, but protecting certain workloads from being killed due to importance of the job or concern about killing long running jobs where too much compute resource is wasted.

Figure 11:
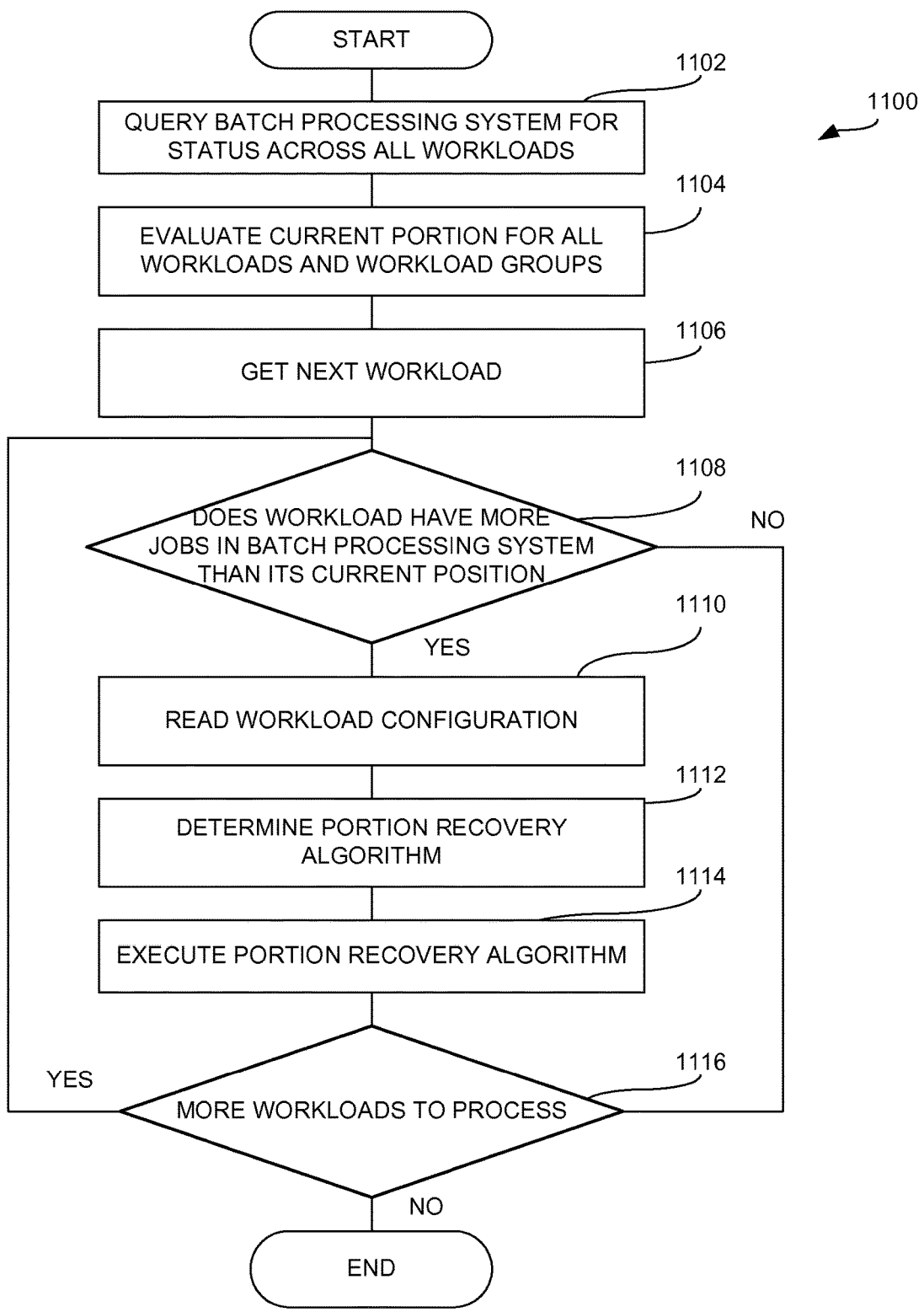
FIG. 11 provides a logic-flow diagram associated with an algorithm for workload portion recovery in accordance with embodiment to the present disclosure.

FIG. 11 provides a logic-flow diagram associated with an algorithm for workload portion recovery in accordance with embodiment to the present disclosure. Operations 1100 begin with block 1102 querying the batch processing system for the status across all workloads. Then block 1104 evaluates the current portion for all workloads and workload groups. Block 1106 retrieves the next workload. Block 1008 examines this workload and decides whether the workload has more jobs in the batch processing system than its current position and ratio allow. If the workload does not have more than its share, then the process continues and determines whether more workloads exist for examination at Decision Point 1116. Otherwise, block 1110 reads the workload configuration in block 1110 and the portion recovery algorithm selected in block 1112. A portion recovery algorithm such as the exemplary portion recovery algorithm of FIG. 10 may then be applied in block 1114.

The automated workload selection system determines if a workload or workload group has more jobs in the batch processing system than its current portion. The calculation must take into account the status of all workloads and workload groups to determine a workload or workload group's current portion. If a workload exceeds its portion, the automated workload selection system reads the recovery algorithms and executes the algorithm on the amount of jobs in excess of its current portion.

Embodiments of the present disclosure provide an algorithm for communicating workload change impacts to users. Embodiments allow the Automated Workload Selection System to provide intuitive control and viewing of system status through the combination of: 1) Algorithms to automatically decrease workload portions when a user increases a siblings workload (including feature to lock workloads that should not be altered); 2) Algorithms to translate portion allocations into various definitions of the number of jobs expected on the queue: a) Lower bound expectations (assume validators are true for all workloads); b) Historically bounded expectations (use history of validator and portion distribution status); c) Current expectations (using current Automated Workload Selection Algorithm); and d) Actual number of jobs (lags current expectations because jobs must complete before the Automated Workload Selection can submit more work); and 3) Algorithms to predict time for a workloads completion. The algorithms may predict time for a workloads completion based on: 1) History of validator and portion distribution status; 2) History of validator status and a new portion distribution status. Alternatively, given a history of the validator status and a desired time of completion, the algorithm can provide a recommended portion distribution to achieve those goals.

This disclosure provides a job submission system and method, which presents a set of algorithms for automated workload selection. A batch processing system such as load leveler or LSF has the ability to run jobs on many computing resources simultaneously. The batch system receives jobs, and when a machine is available, directs a computing resource to execute the job. When all machines (computing resources) associated with the batch system are running jobs, a queue of extra jobs for future execution results. For compute intensive workloads, such as chip design, an automated workload selection system software layer may submit jobs to the batch processing system to keep the batch processing system continually full of useful work. The job submission system provides for: organizing workloads; assigning relative ratios between workloads; associating arbitrary workload validation algorithms with a workload or parent workload to ensure work is useful; associating arbitrary selection algorithms with a workload or workload group; defining high priority workloads that preserve the fairness of the overall system; and constantly balancing the workload selection based on current status of the batch system, validation status, and the workload ratios. The system provides for minimizing the batch system's queue depth to reduce the latency to respond to quickly changing priorities and workload validation results.

In summary, embodiments of the present disclosure provide a system operable to allocate workload within a batch processing system. This system includes one or more servers and a batch processing system communicatively coupled to the one or more servers. The one or more servers are operable to receive a work request and execute work management processing software. The work management processing software validates individual workloads, determines the number of workloads to select and then selects a set of valid workloads to be processed. A batch processing system then receives this set of valid workloads. The batch processing system includes a number of computing resources wherein the work management processing module directs workloads to individual computing resources based on a variety of criteria within the batch processing system. The workloads may include one or more parent workloads and one or more child workloads. Embodiments provide an N-level tree hierarchy such that one child workload may be a parent to several other child workloads.

The flowchart and block diagrams in the FIGS. illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure can take the form of an entirely hardware embodiment, an entirely software embodiment or an embodiment containing both hardware and software elements. A preferred embodiment implements the disclosure in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can couple to the system either directly or through intervening I/O controllers.

Network adapters may also couple to the system to enable the data processing system to couple to other data processing systems or remote printers or storage devices through intervening private or public networks. Modems, cable modem and Ethernet cards are just a few of the currently available types of network adapters.

The terminology used herein describes particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A system comprising:
   at least one server operable to:
      receive workloads from clients, the workloads represented in an n-level tree hierarchy, where n represents an integer; and
      execute a work management processing module for submitting the workloads represented in the n-level tree hierarchy to a batch processing system, the work management processing module operable to:
         validate individual workloads, the workloads comprising at least one parent workload comprising at least one child workload;
         determine a number of workloads to select;
         select a set of valid workloads to be processed; and
         submit the set of valid workloads to the batch processing system, the batch processing system comprising a plurality of computing resources; and
      wherein ratios of jobs are allocated to each at least one parent workload of the n-level tree hierarchy, the ratios are allocated to peers of child workloads under respective parent workloads, and in response to invalidation of jobs of a child workload under one parent workload, a ratio allocated to the invalidated jobs of the child workload is reallocated to child workload peers under the one parent workload.

2. The system of claim 1, the work management processing module operable to allocate and reallocate computing resources to peer child workloads within each at least one parent workload of the n-level tree hierarchy without impacting an allocation of computing resources within a second at least one parent workload of the n-level tree hierarchy based on workload ratios and current workload's job status.

3. The system of claim 2, wherein arbitrary workload validation algorithms validate or invalidate a workload.

4. The system of claim 3, the work management processing module is operable to:
   allocate and reallocate computing resources based on current job status and workload validation; and
   distribute unused job allocations first to peers in the n-level tree hierarchy and then to peers of parent workloads of the n-level tree hierarchy.

5. The system of claim 3, wherein an optional maximum job limit can be associated with any workload in the n-level tree hierarchy.

6. The system of claim 5, the work management processing module operable to:
allocate and reallocate computing resources based on current job status and optional maximum workload limits; and
distribute unused job allocations first to peers in the n-level tree hierarchy and then to peers of parent workloads of the n-level tree hierarchy.

7. The system of claim 2, wherein arbitrary portion recovery algorithms can be associated with any workload in the n-level tree hierarchy.

8. The system of claim 7, the work management processing module is operable to:
identify parent workloads and related child workloads having greater than their assigned ratio of jobs; and
kill jobs based on arbitrary portion recovery algorithms.

9. The system of claim 2, wherein the work management processing module:
detects a job completion rate; and
dynamically changes a time between re-evaluating a set of workloads to maintain a number of queued but not running jobs in the batch processing system at a number that avoids latency penalties.

10. The system of claim 2, wherein the work management processing module:
detects a job completion rate, a job submission rate; and
creates or terminates job submission helpers to match the job submission rate to the job completion rate.

11. The system of claim 2, wherein selection algorithms operable to select the workloads of at least one child workload under a parent workload can be assigned to any parent workload of the n-level tree hierarchy.

12. The system of claim 2, wherein workload group anywhere in the n-level tree hierarchy can be reprioritized as a priority.

13. A computer implemented method comprising:
receiving workloads from clients at a server for submission to a batch processing system, the workloads represented in an n-level tree hierarchy, where n represents an integer;
validating individual workloads with a work management processing module executed at the server, the workloads comprising at least one parent workload, the at least one parent workload comprising at least one child workload, wherein validating individual workloads comprises determining whether the workloads have a number of failures exceeding a threshold value;
receiving a high priority workload within one parent workload;
reassigning computing resources associated with child peer workloads under the one parent workload to the high priority workload;
determining a number of workloads to select with the work management processing module;
selecting a set of valid workloads to be processed with the work management processing module; and
submitting as directed by the work management processing module the set of valid workloads to the batch processing system, the batch processing system coupled to a plurality of computing resources.

14. The computer implemented method of claim 13, further comprising:
allocating and reallocating computing resources to child workloads within a first parent workload without impacting an allocation of computing resources within a second parent workload;
halting processing within the first parent workload when a number of failures associated with child workloads within the first parent workload exceed a threshold value; and
reassigning computing resources associated with the halted first parent workload to remaining parent workloads.

15. The computer implemented method of claim 14, further comprising portion recovery of computing resources assigned to the remaining parent workloads when resuming processing within the first parent workload.

16. The computer implemented method of claim 14, the first parent workload comprising simulation tests on an integrated device.

17. The computer implemented method of claim 14, wherein validating individual workloads comprises selecting a validation algorithm for any set or subset of workloads.

18. The computer implemented method of claim 14, wherein individual workloads are associated with a first group, the work management processing module operable to allocate computing resources among N groups, the allocation of computing resources to any group of the N group does not exceed an assigned value.

19. A computer implemented method comprising:
processing workloads received from a work management processing module executed at a server and represented in an n-level tree hierarchy, where n represents an integer, with a batch processing system, the batch processing system communicatively coupling to a plurality of computing resources, the workloads comprising at least one parent workload, the at least one parent workload comprising at least one child workload;
identifying parent workloads and related child workloads submitted to the plurality of computing resources by the batch processing system having greater than a ratio of jobs assigned to the parent workloads and related child workloads; and
killing jobs based on an arbitrary portion recovery algorithm executed by a workload management system.

20. A computer implemented method comprising:
processing workloads received from a work management processing module executed at a server and represented in an n-level tree hierarchy, where n represents an integer, with a batch processing system, the batch processing system communicatively coupling to a plurality of computing resources, the workloads comprising at least one parent workload, the at least one parent workload comprising at least one child workload;
allocating and reallocating computing resources to workloads within a first parent workload without impacting an allocation of computing resources within a second parent workload, the first parent workload located within a first branch of the n-level tree hierarchy, the second parent workload within a second branch of the n-level tree hierarchy, wherein the first parent workload comprises child workloads arranged in the n-level tree hierarchy; and
in response to invalidation of jobs of at least one of the child workloads, allocating a ratio of the invalidated jobs to jobs of another child workload of the first parent workload.

21. A computer implemented method comprising:
processing workloads received from a work management processing module executed at a server and represented in an n-level tree hierarchy, where n represents an integer, with a batch processing system, the batch processing system communicatively coupling to a plurality of computing resources, the workloads comprising at least one parent workload, the at least one parent workload comprising at least one child workload; and
halting processing within a first parent workload when a number of failures associated with child workloads within the first parent workload exceed a threshold value; and
reallocating computing resources to workloads that are peers of the first parent workload, the workloads that are peers of the first parent workload located within a first branch of the n-level tree hierarchy, the reallocating does not negatively impact an allocation of computing resources within a second parent workload, the second parent workload within a second branch of the n-level tree hierarchy.

* * * * *